(12) United States Patent
Pellegrino et al.

(10) Patent No.: US 7,777,375 B2
(45) Date of Patent: Aug. 17, 2010

(54) DEVICES, SYSTEMS, AND METHODS FOR PRODUCING AN ELECTRIC MOTOR

(75) Inventors: Brian Pellegrino, Ashland, OH (US); Kim Hussain, Loveland, OH (US); William R. Finley, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 344 days.

(21) Appl. No.: 11/833,589

(22) Filed: Aug. 3, 2007

(65) Prior Publication Data

US 2008/0116754 A1    May 22, 2008

Related U.S. Application Data

(60) Provisional application No. 60/839,891, filed on Aug. 24, 2006.

(51) Int. Cl.
*H02K 9/00* (2006.01)
(52) U.S. Cl. ....................................................... 310/61

(58) Field of Classification Search .................. 310/61, 310/52, 58
See application file for complete search history.

(56) References Cited

U.S. PATENT DOCUMENTS

| 3,800,174 | A | * | 3/1974 | Butterfield et al. | ............ 310/61 |
| 5,714,816 | A |  | 2/1998 | Jensen |  |
| 5,861,700 | A | * | 1/1999 | Kim | ..................... 310/216.119 |
| 6,069,424 | A |  | 5/2000 | Colello |  |
| 2005/0067918 | A1 |  | 3/2005 | Holter |  |

FOREIGN PATENT DOCUMENTS

| DE | 195 11 114 C1 | 8/1996 |
| DE | 102004047735 | 4/2006 |
| GB | 518207 | 2/1940 |

* cited by examiner

*Primary Examiner*—Nguyen N Hanh
(74) *Attorney, Agent, or Firm*—Filip A. Kowalewski

(57) ABSTRACT

Certain exemplary embodiments comprise an electric motor that comprises a stiff shaft. The electric motor can have an output rating that is greater than approximately 200 horsepower. The electric motor can have a ratio of a rotor core length to an outside stator diameter that is greater than approximately 0.7.

22 Claims, 13 Drawing Sheets

11000

Detail A

DEVICES, SYSTEMS, AND METHODS FOR PRODUCING AN ELECTRIC MOTOR

CROSS-REFERENCES TO RELATED APPLICATIONS

This application claims priority to, and incorporates by reference herein in its entirety, pending U.S. Provisional Patent Application Ser. No. 60/839,891, filed 24 Aug. 2006.

BACKGROUND

Certain exemplary electric motor applications might be associated with one or more standards. For example, certain electric motors can be associated with an American Petroleum Institution (API) standard. Such motors might be specified such that a critical speed of the motor shaft is greater than a specified operational range of the electric motor. A larger shaft diameter can be utilized in such applications, which can impede a flow of cooling air. An improved design of electric motors to reduce airflow impedances can be desirable.

SUMMARY

Certain exemplary embodiments comprise an electric motor that comprises a stiff shaft. The electric motor can have an output rating that is greater than approximately 200 horsepower. The electric motor can have a ratio of a rotor core length to an outside stator diameter that is greater than approximately 0.7.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
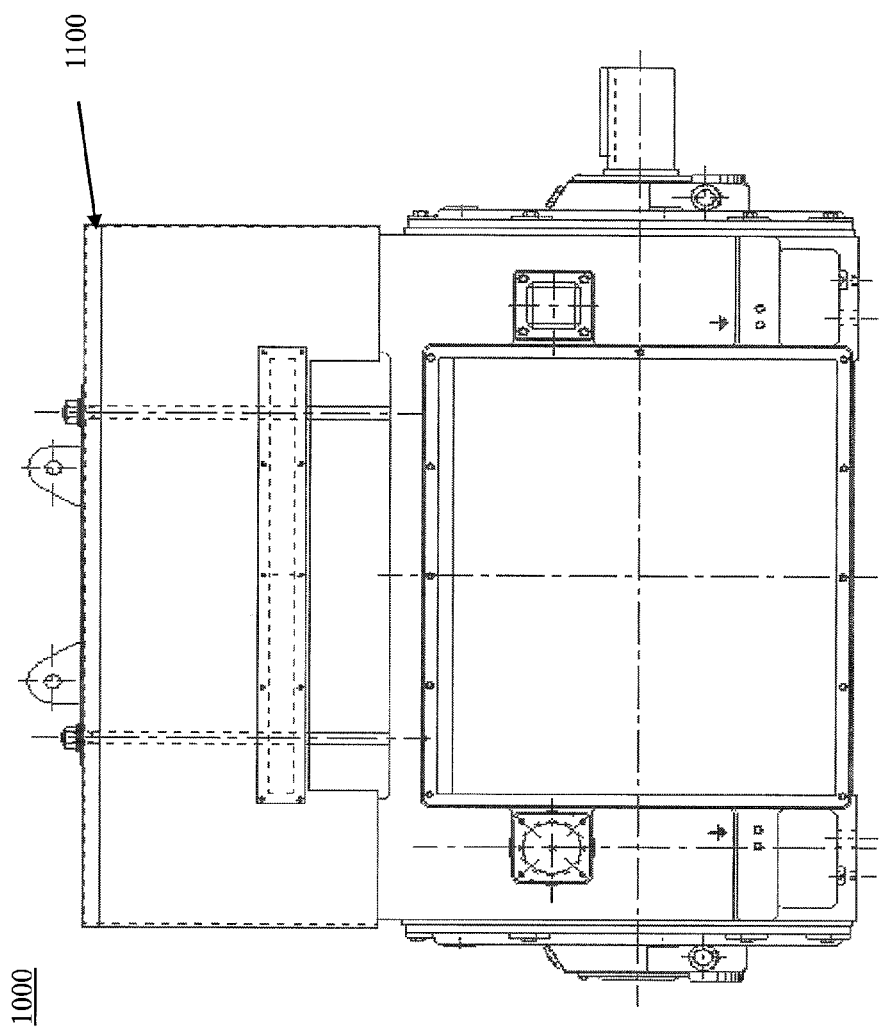
FIG. 1 is a side view of an exemplary embodiment of a system 1000.

Certain exemplary embodiments provide an electric motor that comprises a shaft. The electric motor can have an output rating that is greater than approximately 200 horsepower. The electric motor can have a ratio of a rotor core length to an outside stator diameter that is greater than approximately 0.7.

In certain exemplary embodiments, an electric motor can be controlled via a variable frequency drive, which can be adapted to operate the electric motor at different speeds. In certain exemplary embodiments, the electric motor can be a 2-pole motor, which can be adapted to operate continuously at a rotational speed of approximately 3600 RPM. The electric motor can be a 680 or 800 frame size electric motor. The electric motor can be designed to meet one or more specifications provided by the American Petroleum Institute (API). In certain exemplary embodiments, the electric motor can be designed and/or constructed such that a critical speed associated with the electric motor is above an operational range of the electric motor. The operational range of the electric motor can range from approximately 1400 RPM to approximately 4400 RPM. A shaft with a critical speed above the operational range can be referred to as a stiff shaft or rigid shaft. Certain exemplary electric motors having 680 and 800 frames have a shaft with a critical speed below the operational speed that can be referred to as a flexible shaft. In certain exemplary embodiments, stiff shafts can have a larger shaft diameter than comparable flexible shafts. A larger shaft diameter can limit a power output compared to a flexible shaft due to an associated reduction in airflow.

In order to cool a high speed induction motor, air flow can be channeled to cool end windings and/or an interior of a rotor and stator core. A system adapted to facilitate air flow through the rotor and stator core can comprise:

- an axial fan adapted to pressurized the air;
- an opening created by an inside diameter (ID) of a rotor end connector and an outside diameter (OD) of a rotor shaft of the motor;
- axial vents of the rotor via which the air can enter the motor;
- a turn of approximately ninety degrees, after which the air flow might pass between rotor bars of the electric motor;
- a sub-path through a stator of the electric motor between stator coils; and
- air might then exit the stator and might travel to an exit at a yoke of the electric motor.

In such an air flow path, a space between the rotor bars and/or a space between the stator coils can potentially restrict air flow. In certain exemplary embodiments, where a critical speed is above an operating speed, an inlet to rotor axial vents can restrict air flow. In certain exemplary embodiments, the rotor shaft can be larger than in flexible shaft electric motors in order to raise the critical speed. The electric motor can have a rotor core length to stator outer diameter ratio of approximately 0.8. Restrictions in the air flow path can reduce a power output of the electric motor. In order to achieve more power from the electric motor, an axial inlet area to the rotor and/or axial vents can be increased. Since a fixed amount of electrical flux might travel through an area between the axial vents, the width dimension of the axial vent might not be increased. In certain exemplary embodiments, the height of the vent can to be increased. By increasing the height of the vent, several changes can be made. For example, an end connector can to be modified in order not to block the vent. The outside diameter of the end connector might fixed by an inside diameter of the stator since the rotor passes through the stator in order to be assembled. An area of the end connector can be utilized for heat storage during locked rotor condition. The end connector can be modified to remove a "lip" in order to allow entrance to axial rotor vents. Such a modification might have a relatively small impact on end connector area. By increasing the outside diameter of the axial vents, area between the axial vents and the rotor bar might be reduced. Such an increase might increase centrifugal forces acting on this "ring", which might be beyond the limits of electrical steel being used.

In certain exemplary embodiments, the height and/or width of the rotor bar can be increased or reduced as compared to exemplary flexible shaft electric motors. In certain exemplary embodiments, for an exemplary electric motor that might otherwise comprise a flexible shaft of approximately 8.0 inches in diameter, a stiff shaft can be utilized that has a diameter of approximately 12.5 inches. For such an exemplary electric motor, the width of the rotor bar can be increased from approximately 0.44 inches for a flexible shaft design to approximately 0.60 inches for a stiff shaft design. A height of the rotor bar might be decreased from approximately 1.75 inches to approximately 1.00 inches. In order to compensate a reduction of area of the rotor bar, the rotor bar can be made wider. Such a modification might affect a per unit (PU) locked rotor torque and a PU breakdown torque. Design modifications to the electric motor can proceed iteratively until a predetermined electrical performance is met and/or the rotor axial vents are no longer a significant restriction, and mechanical stresses are acceptable. Certain exemplary embodiments can achieve an increase of approximately 32 percent of airflow through the rotor and stator core area, and can achieve an increase in power output of the electric motor of approximately 30 percent. Rotor bar dimensions can be specified based upon one or more of a desired starting torque, a desired breakdown torque, a desired cooling airflow resistance, and/or a desired electric current flow rating of the electric motor.

In certain exemplary embodiments, a size and/or shape of an end connector and/or axial vents in a rotor can be modified. Such a design can be performed via a complex series of analytical calculations. Thereby, more airflow can enter the electric motor for cooling, which can increase the power output. Based on test results the redesign might exceed needs and/or expectations. For example, a motor nominally rated at approximately 5000 horsepower rating can be adapted to produce approximately 6500 horsepower.

TABLE 1

|  | Stiff Shaft Electric Motor | Flex Shaft Electric Motor |  |
|---|---|---|---|
| Rotor Entry | 36.0 | 32.5 | in$^2$ |
| Rotor Restriction | 34.5 | 59.0 | in$^2$ |
| Stator Restriction | 55.6 | 77.9 | in$^2$ |
| Rotor Entry/Rotor Restriction | 1.04 | 0.55 |  |

TABLE 2

| St I$^2$R | Rt I$^2$R | Total | Rotor Air Flow | CFM/kW loss in core |
|---|---|---|---|---|
| 19.7 | 19.3 | 141.7 | 1093 ft$^3$/min | 18.9 ft$^3$/min/kW |

In certain exemplary embodiments, a rotor inlet can be a source of restriction in the air flow circuit. An axial vent can be designed to have a similar restriction as an exemplary motor having an 8012 frame size. The axial vent can be designed to have a relatively low restriction to air flow at a rotor inlet. Due to a comparatively larger height of the axial vent, a smaller rotor bar can be utilized. An increased rotor resistive heat generation can be offset by increased airflow in an exemplary electric motor.

Design constraints for an exemplary embodiment can comprise:

5000 horsepower, 4.0 kilovolts, 3600 revolutions per minute, 105 degree Celsius rise at a 1.15 service factor for use with a variable frequency drive for a pipeline application;

no critical speed within an operating range of approximately 24 to approximately 66 hertz and at approximately 4400 RPM; and/or a rating beyond a standard 8010 stiff shaft design for a 5000 horsepower electric motor.

A design for an exemplary embodiment can comprise:

a modified rotor to relatively increase airflow through a core area of the electric motor;

reduce other restrictions for airflow;

increase an idle loss due to a relative increase in air flow in the core, which might impact an efficiency of the electric motor;

if a target horsepower rating is met, a stiff shaft might replace a flexible shaft on an exemplary 8010 frame motor, which might allow a consolidation of parts and/or reducing a variety of parts;

due to larger diameter of shaft, standardizing on stiff shaft design might result in a relative increase in a cost of the electric motor as compared to flexible shaft electric motors;

an electric motor that meets and/or exceeds specified design and/or performance criteria;

test results for an exemplary embodiment can be 51.2 degrees Celsius rise by resistance (R/R) 76.6 degrees Celsius rise by detector (R/Det) at approximately 5732 horsepower;

a maximum horsepower rating for an exemplary motor comprising a stiff shaft might be increased from approximately 5000 horsepower to approximately 6500 horsepower; and/or operate at a noise level of less than approximately 85 decibels.

FIG. 1 is a side view of an exemplary embodiment of a system 1000, which can comprise an alternating current induction motor 1100, such as a NEMA motor and/or an above-NEMA motor.

Figure 2:
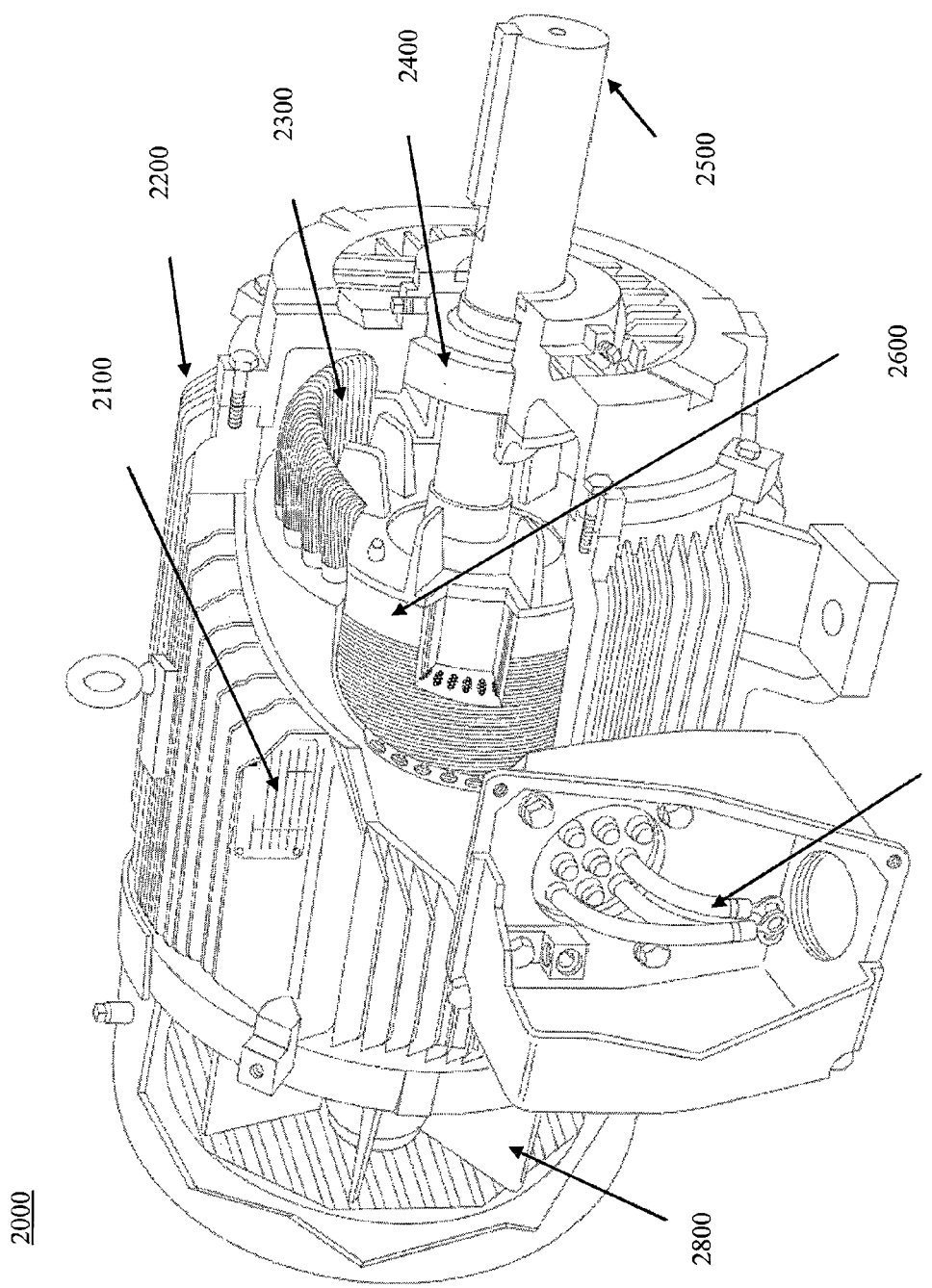
FIG. 2 is a perspective view of an exemplary embodiment of a system 2000.

FIG. 2 is a cut-away perspective view of an exemplary embodiment of a system 2000, which can comprise an alternating current induction motor 2100, which can comprise a nameplate 2100 that identifies certain characteristics of the motor, frame 2200, stator 2300, bearing 2400, shaft 2500, rotor assembly 2600, supplied electrical power cables 2700, and/or fan 2800.

Figure 3:
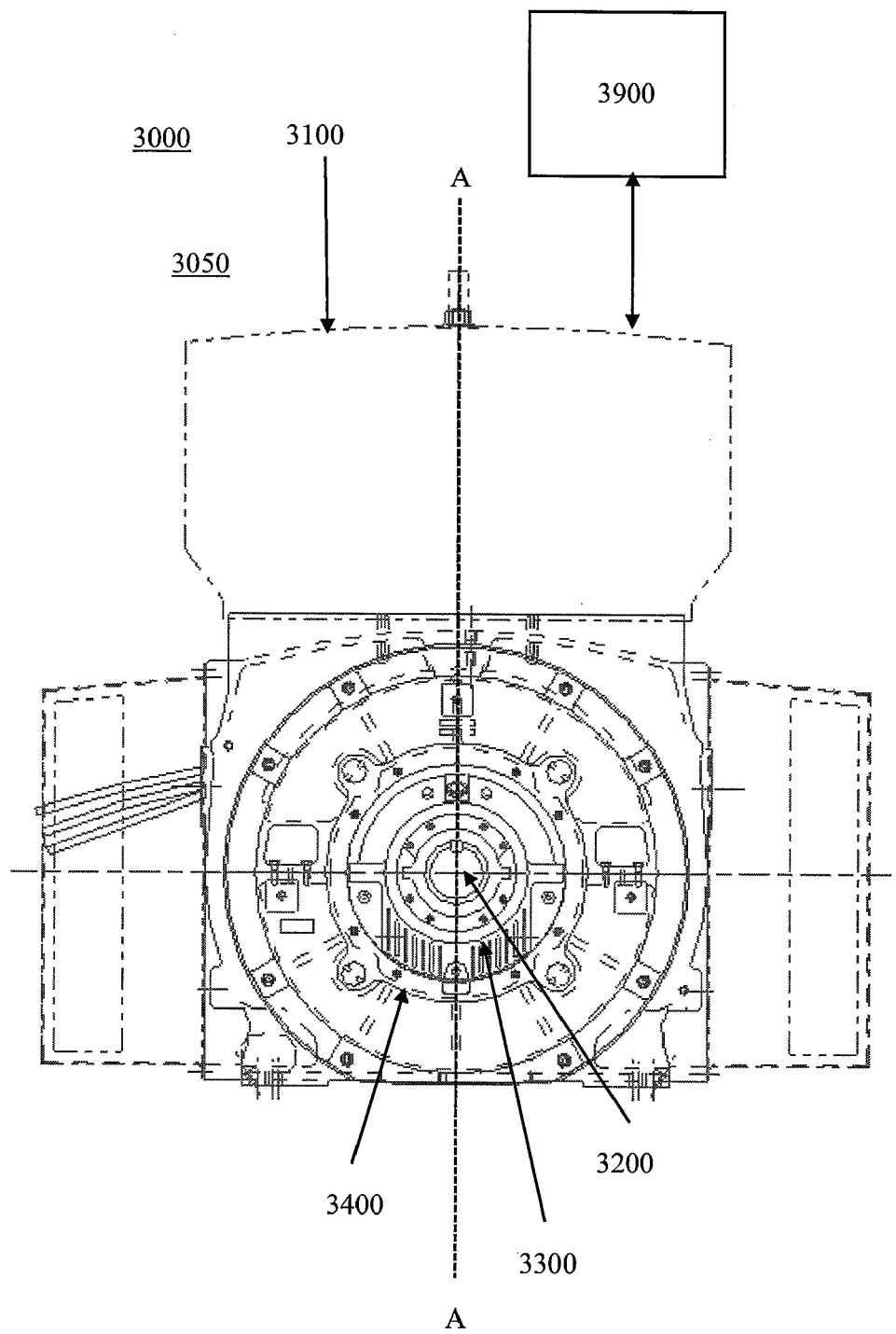
FIG. 3 is an end view of an exemplary embodiment of a system 30000.

FIG. 3 is an end view of an exemplary embodiment of a system 3000, which can comprise an electric motor 3050, motor housing 3100, shaft 3200, rotor 3300, and stator 3400. In certain exemplary embodiments, shaft 3300 can be a stiff shaft. System 3000 can comprise a variable speed drive 3900, which can be electrically coupled to electric motor 3050. Variable speed drive 15900 can be adapted to provide energy to electric motor 3050 and/or control a rotational speed of shaft 3200.

Figure 15:
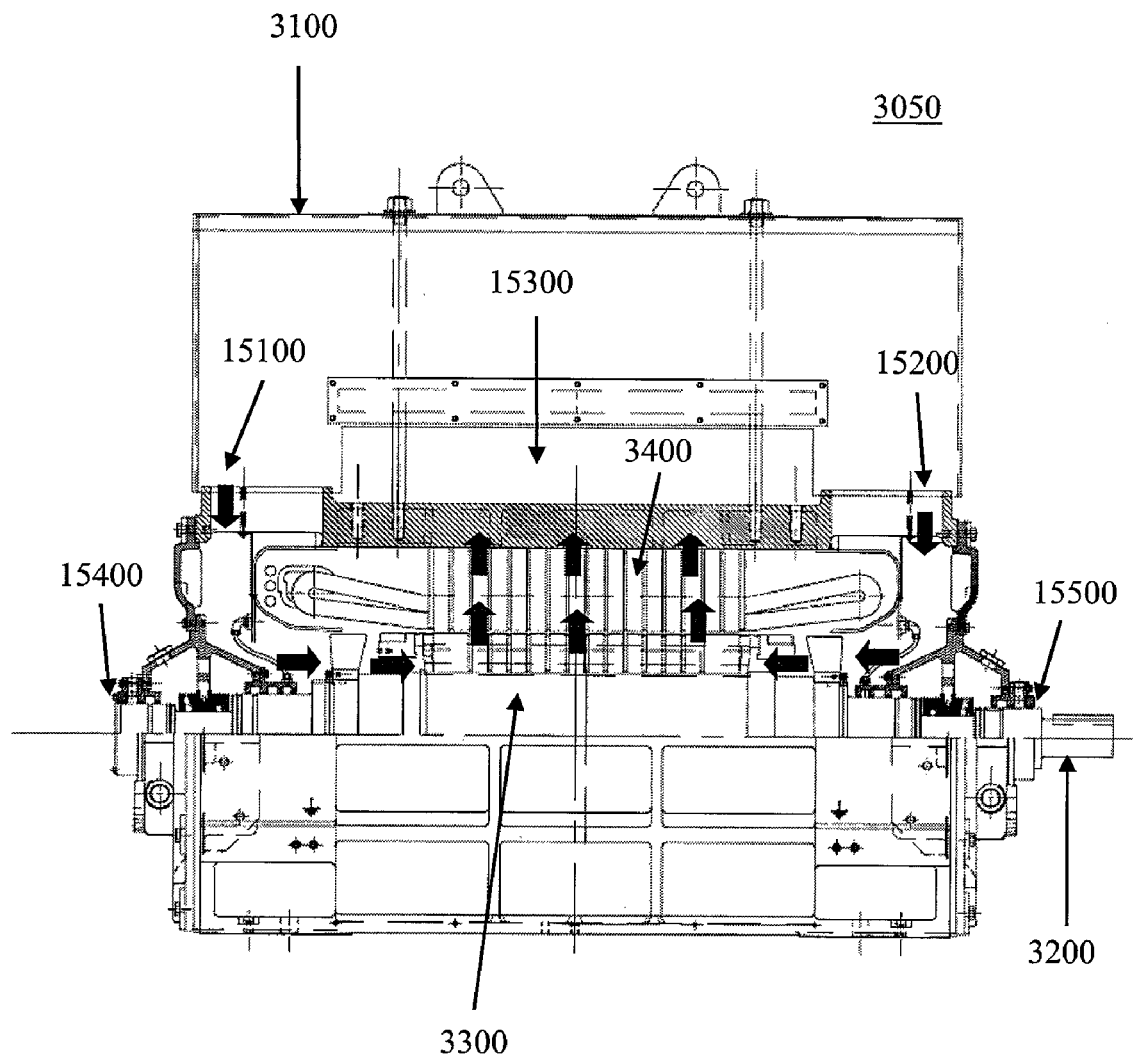
FIG. 15 is a cross-sectional view of an exemplary embodiment of a system 15000, which corresponds to section A-A of FIG. 3.

FIG. 15 is a cross-sectional view of an exemplary embodiment of a system 15000, which corresponds to section A-A of FIG. 3 and can comprise an electric motor 3050. Electric motor 3050 can comprise a shaft 3200, a stator 3400, and a rotor 3300. In certain exemplary embodiments, shaft 3200 can be a stiff shaft. In certain exemplary embodiments, the stiff shaft can have a portion with a diameter of approximately 12.5 inches. Electric motor 3050 can comprise one or more bearings such as first bearing 15400 and second bearing 15500. Each of first bearing 15400 and second bearing 15500 can be a sleeved stiff shaft bearing. Electric motor 3050 can have a ratio of a rotor core length to an outside stator diameter that is greater than approximately 0.7. Electric motor 3050 can have a ratio of a diameter of the stiff shaft to an outside rotor diameter of greater than approximately 0.5. Electric motor 3050 can have an output ratio of greater than approximately 200 horsepower. The output rating of electric motor 3050 can be, for example, in horsepower, 200, 350, 400, 500, 600, 1000, 2000, 2500, 5000, 6000, 6500, 7000, 10,000, 15,000, and/or any value or subrange therebetween.

Electric motor 3050 can have a nominal operating speed of approximately 3600 revolutions per minute. Electric motor 3050 can be designed to operate, without reaching a critical speed, at rotational speeds, in revolutions per minute of, 100, 250, 400, 700, 1125, 1780, 1800, 1920, 2200, 2955, 3112, 3487, 3600, 3999, 4120, 4320, 4331, 4400, 4650, and/or any value or subrange therebetween. In certain exemplary embodiments, electric motor 3050 can have a specified limit on an increase in operating temperature when electric motor 3050 is operating in an environment that is at a temperature of approximately 40 degrees Celsius. The specified limit can be 105 degree Celsius. In certain exemplary embodiments, electric motor 3050 can have a service factor rating of approximately 1.15. Electric motor 3050 can have a frame size selected from a group of frame sizes that comprises 8010, 8012, 6811, and 6813.

System 15000 can have a defined a rotor cooling air pathway that comprises a plurality of defined air channels via which cooling air can flow. The plurality of defined air channels can ventilate a rotor of the electric motor via an entry of cooling air into a first end air channel 15100 and a second end air channel 15200. The plurality of defined air channels can ventilate the rotor of the electric motor via an exit of cooling air from the rotor into an air exit portion 15300. The defined a rotor cooling air pathway can have a ratio of an inlet area to an outlet area of greater than approximately 1.0.

Figure 4:
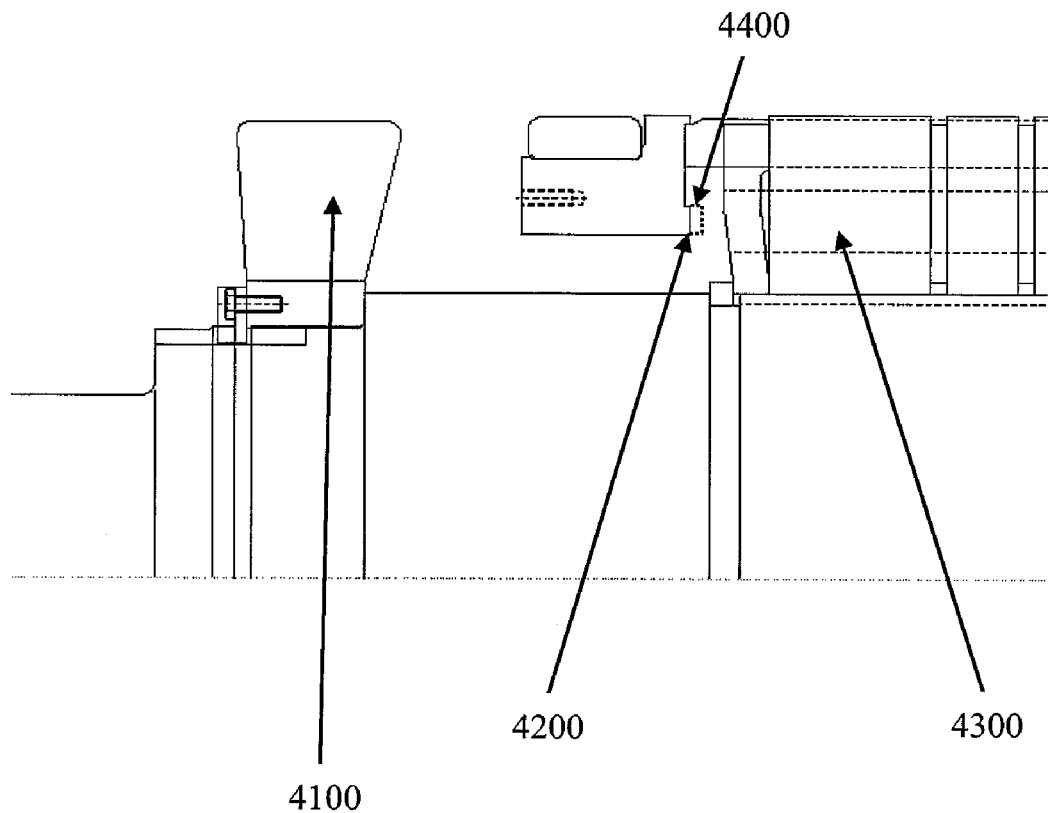
FIG. 4 is a side view of an exemplary embodiment of a system 4000.

FIG. 4 is a side view of an exemplary embodiment of a system 4000, which can comprise an axial fan 4100. Axial fan 4100 can be adapted to provide cooling air that circulates to cool an electric motor comprised by and partially illustrated in system 4000. In certain exemplary embodiments, an end connector 4200 can be machined as compared to an end connector of a comparable flexible shaft motor. Machining a lip 4400 from end connector 4200 can increase an opening via which cooling air can flow through system 4000. System 4000 can comprise an axial vent 4300 via which cooling air can flow.

Figure 5:
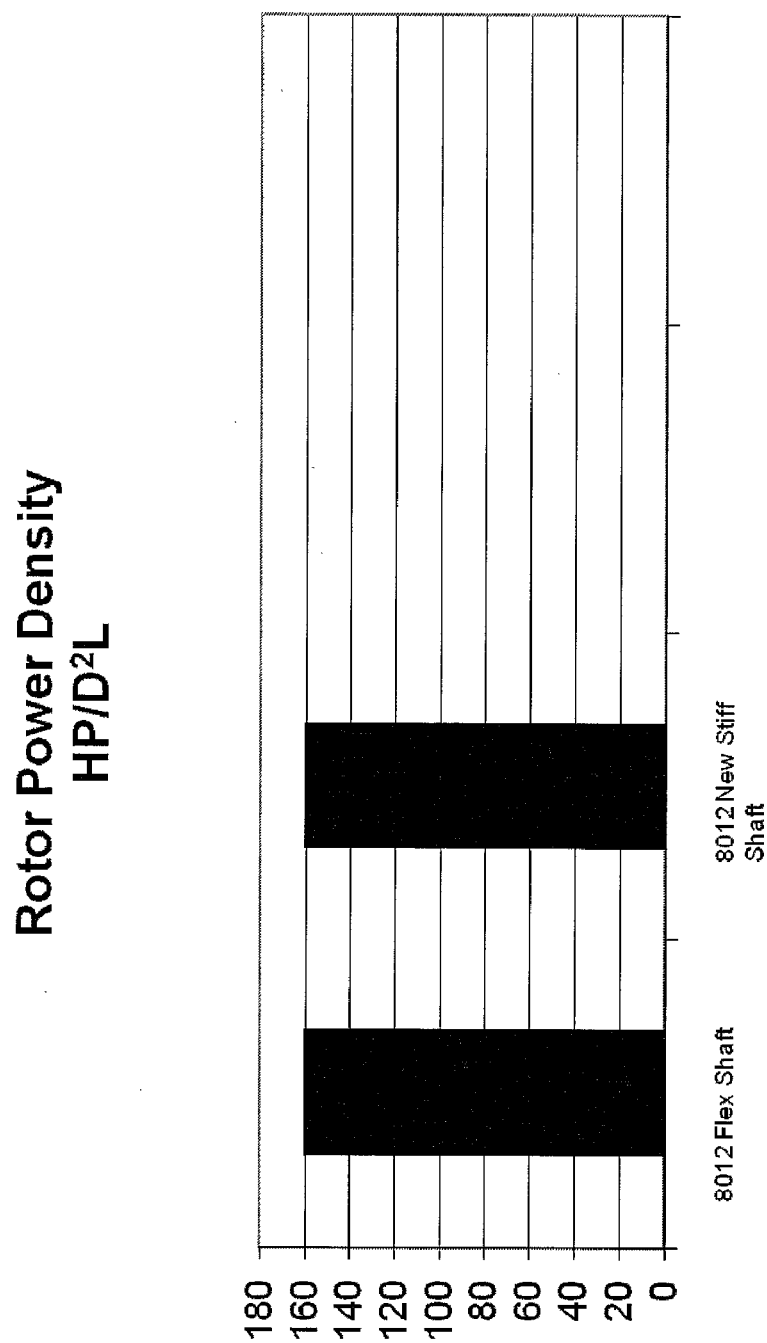
FIG. 5 is a bar chart of properties of certain exemplary electric motors.

FIG. 5 is a bar chart of properties of certain exemplary electric motors. The bar chart illustrates, for certain exemplary electric motors, a ratio of a nominal electric motor horsepower rating to a product of a square of a rotor diameter and a length of the rotor. The bar chart indicates electric motors labeled as 8012 Flex Shaft and 8012 New Stiff Shaft, according to certain exemplary embodiments, have a ratio of approximately 160.

Figure 6:
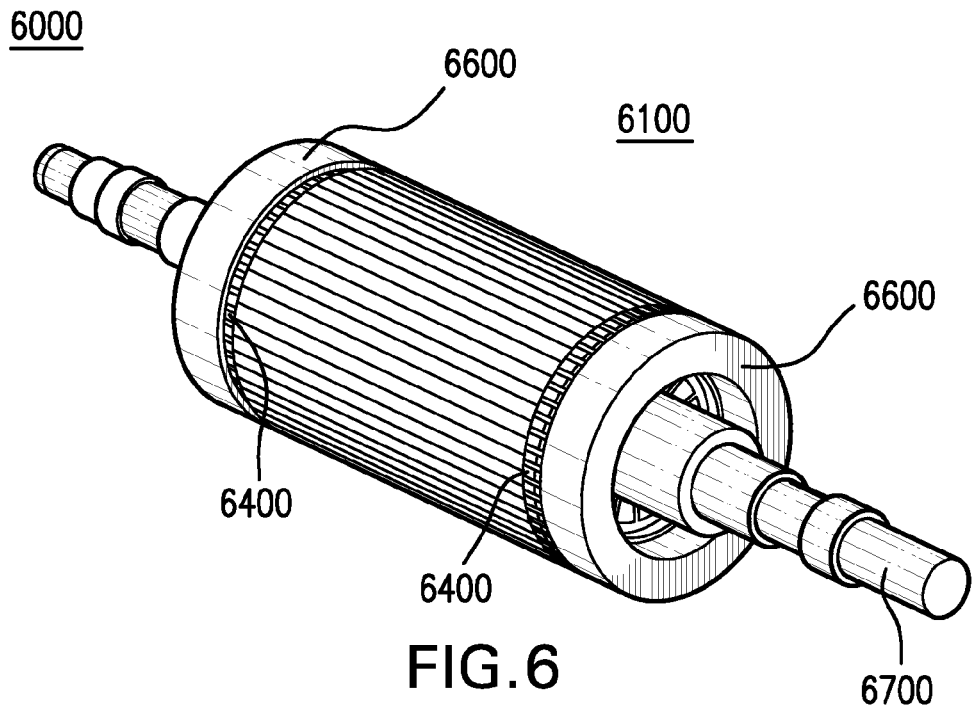
FIG. 6 is a perspective view of an exemplary embodiment of a system 6000.
Figure 7:
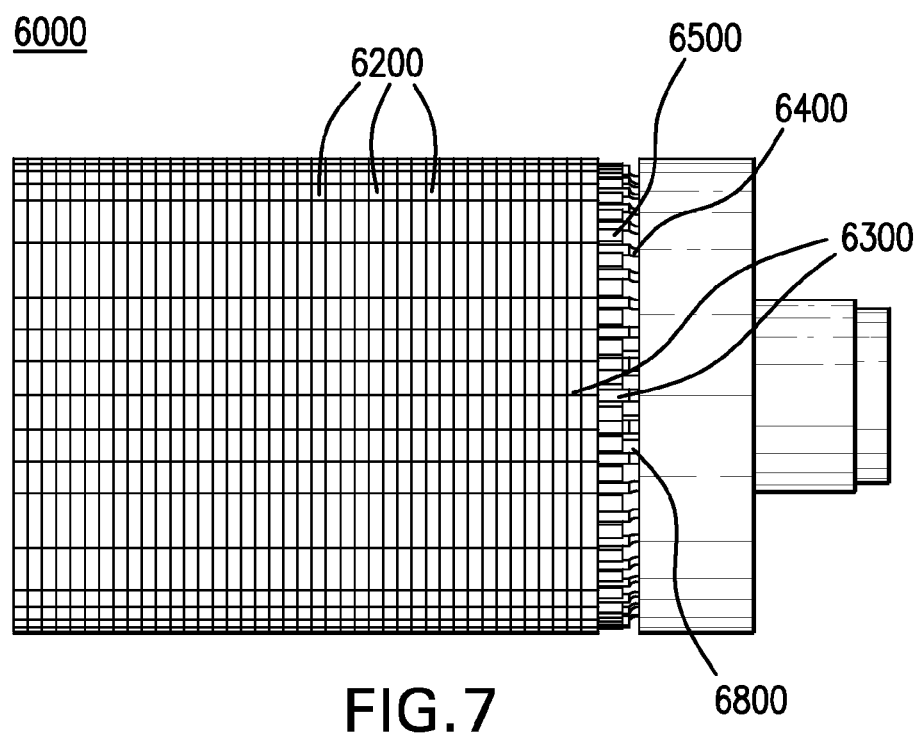
FIG. 7 is a side view of system 6000.

FIG. 6 is a perspective view, and FIG. 7 is a side view of an exemplary embodiment of a system 6000, which can comprise rotor assembly 6100, which can comprise a stacked plurality of laminations 6200; a set of radially distributed rotor conductor bars 6300, each defining a pair of opposing bar end regions 6400; a securement ring 6500; an end ring 6600; and/or a shaft 6700. Conductor bars 6300 and/or end rings 6600 can be comprised of copper. In system 6000 a stator-side opening 6800 is visible.

Figure 8:
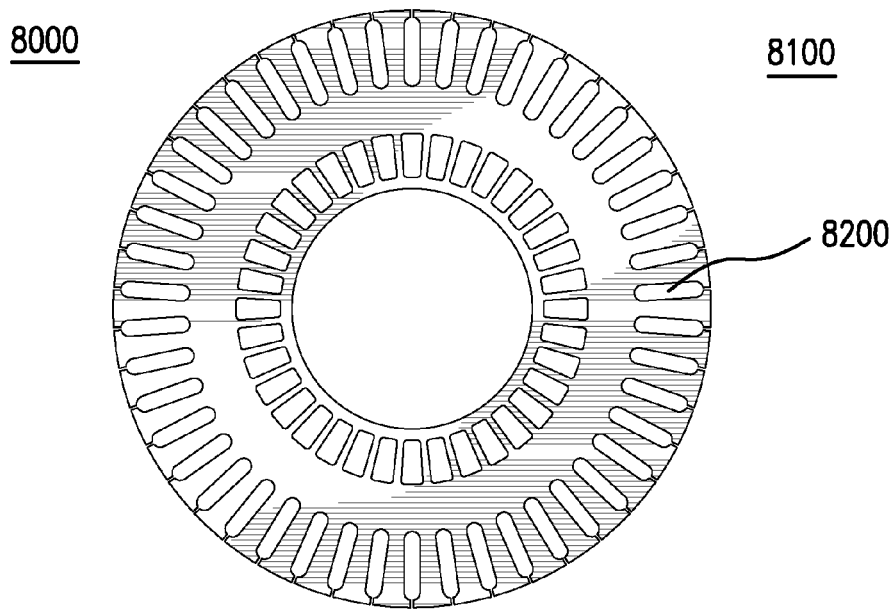
FIG. 8 is an end view of an exemplary embodiment of a rotor end 8000.

FIG. 8 is a side view of an exemplary embodiment of a system 8000, which can comprise a rotor lamination 8100, which can comprise slots 8200 to accommodate conductor bars.

Figure 9:
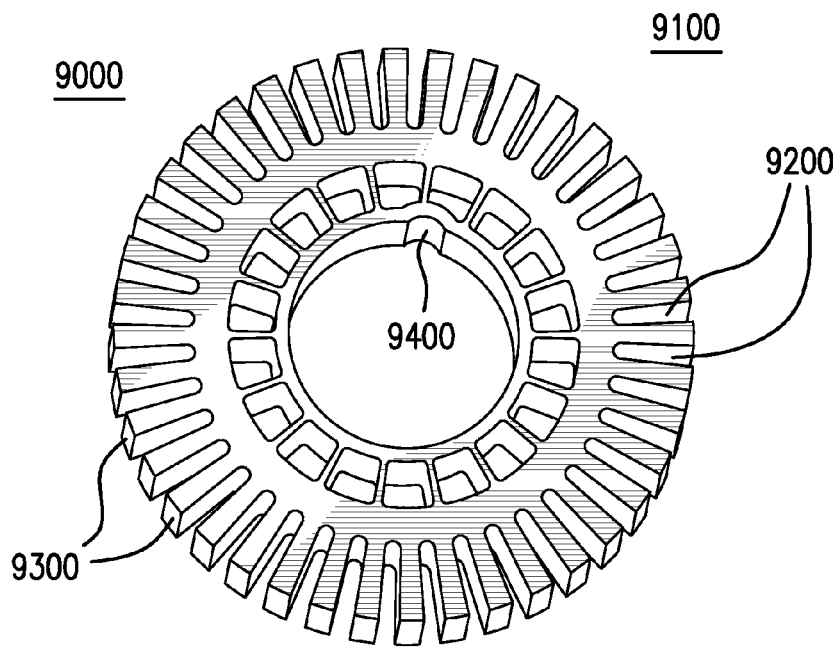
FIG. 9 is a perspective view of an exemplary embodiment of a rotor end 9000.

FIG. 9 is a perspective view of an exemplary embodiment of a system 9000, which can comprise a securement ring 9100, which can be used to compress, secure, and/or support a stacked plurality of rotor laminations. Securement ring 9100 can comprise a radially distributed plurality of slots 9200 that can accommodate the conductor bars, and a plurality of teeth 9300 that can straddle, separate, and/or provide space apart each rotor conductor bar. Securement ring 9100 can comprise a keyway 9400 that can accommodate a key that can locks securement ring 9100 to the rotor shaft.

Figure 10:
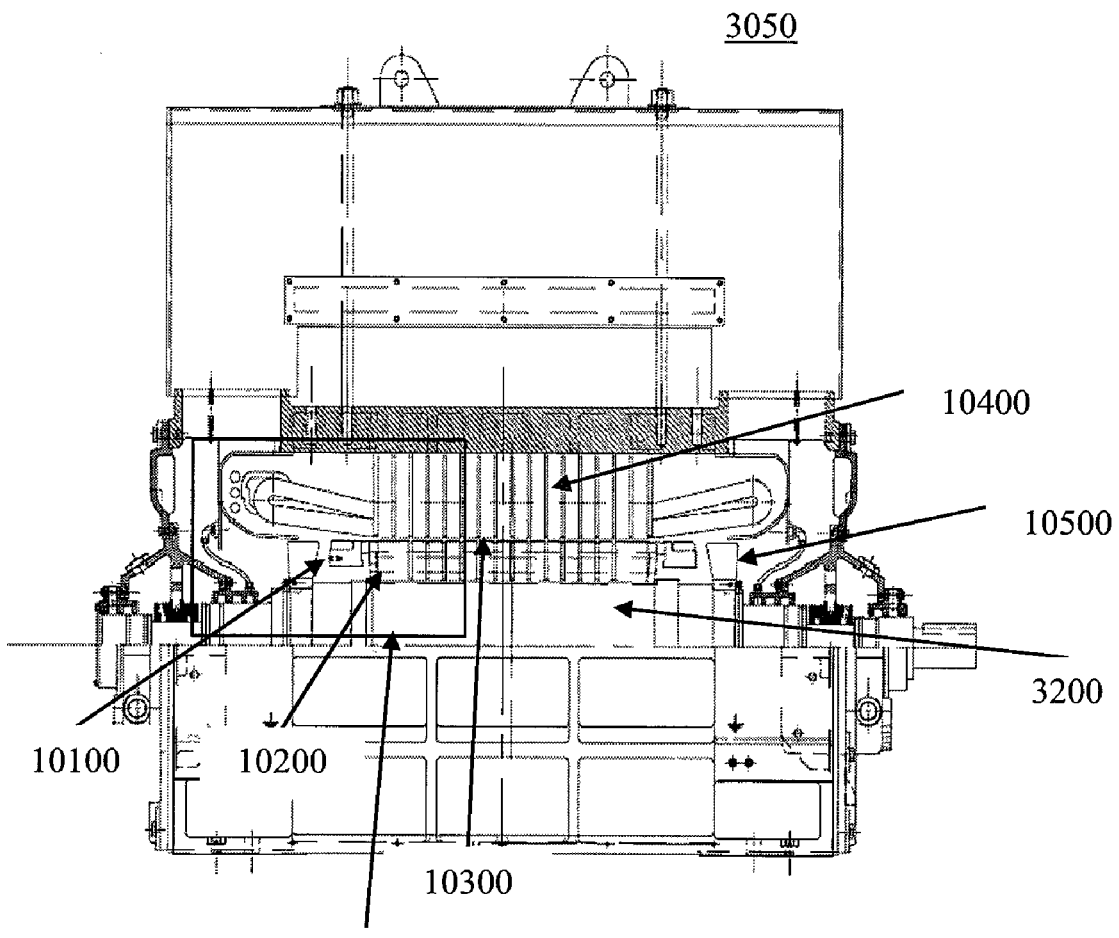
FIG. 10 is a cross-sectional view of an exemplary embodiment of a representation of a system 10000, which corresponds to section A-A of FIG. 3.

FIG. 10 is a cross-sectional view of an exemplary embodiment of a of a system 10000, which corresponds to section A-A of FIG. 3 and comprises electric motor 3050. Electric motor 3050 can comprise a rotor end connector 10100. Rotor end connector 10100 can be machined relative to an end connector design for a flexible shaft motor in order to increase a cross sectional area of a defined cooling air pathway via which cooling air can flow. Electric motor 3050 can comprise a rotor axial vent 10200. Each rotor axial vent of electric motor 3050 can have a cross-sectional area and can define a portion of the cooling air pathway. Cooling air entering a rotor of electric motor 3050 can be channeled out of the rotor via a rotor radial vent 10300. Cooling air exiting radial vent 10300 can flow out of a stator of electric motor 3050 via stator radial vent 10400. Motive force for moving cooling air from rotor end connector 10100 via rotor axial vent 10200, rotor radial vent 10300, and stator radial vent 10400 can be provided via an axial fan 10500. In certain exemplary embodiments, electric motor 3050 can comprise a rotor shaft 3200, which can be a stiff shaft.

Figure 11:
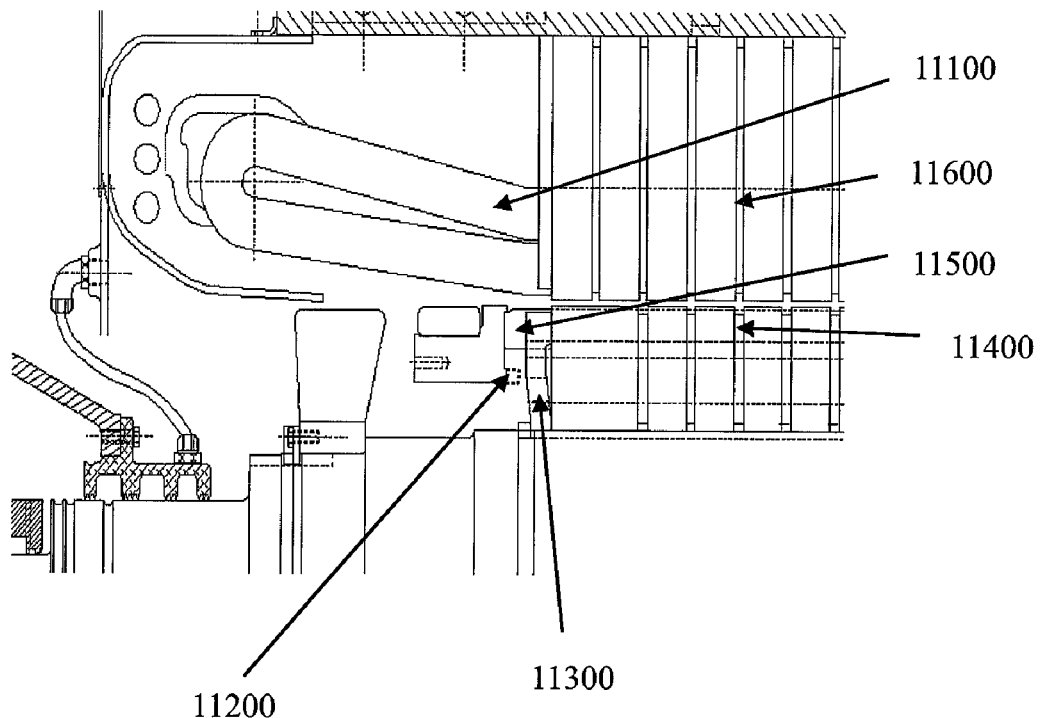
FIG. 11 is a detail view of an exemplary embodiment of a representation of an electric motor 11000, which corresponds to Detail A of FIG. 10.

FIG. 11 is a cross-sectional view of an exemplary embodiment of a representation of a portion of an electric motor 11000, which can comprise stator coils 11100. Cooling air to cool electric motor 11000 can flow through a rotor of electric motor 11000 via a cooling air pathway at least partially defined by a rotor end connector lip 11200, which can be completely or partially removed responsive to an installation of a stiff shaft in electric motor 11000. The cooling air pathway can be partially defined by a rotor axial vent 11300, a rotor radial vent 11400, rotor bars 11500, and a stator radial vent 11600.

Figure 12:
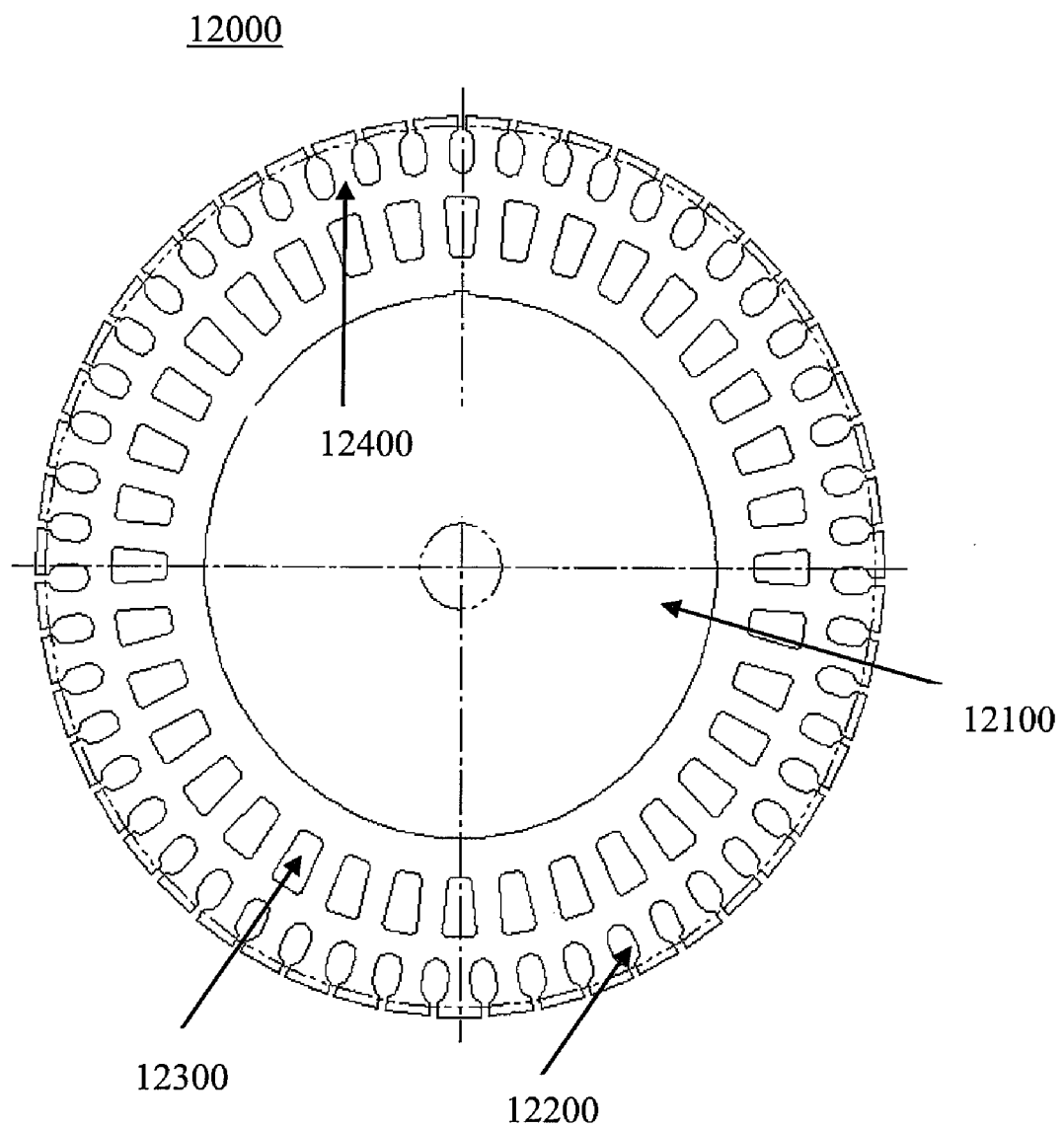
FIG. 12 is an end view of an exemplary embodiment of a rotor end 12000.

FIG. 12 is an end view of an exemplary embodiment of a rotor end 12000, which can comprise a rotor shaft 12100 and rotor bars such as rotor bar 12200. Cooling air can flow through rotor end 12000 via a plurality of rotor axial vents such as rotor axial vent 12300 and a plurality of spaces such as space 12400 between the plurality of rotor bars. A resistance to air flow can be partially determined via a cross sectional area of the plurality of rotor axial vents and the plurality of spaces.

Figure 13:
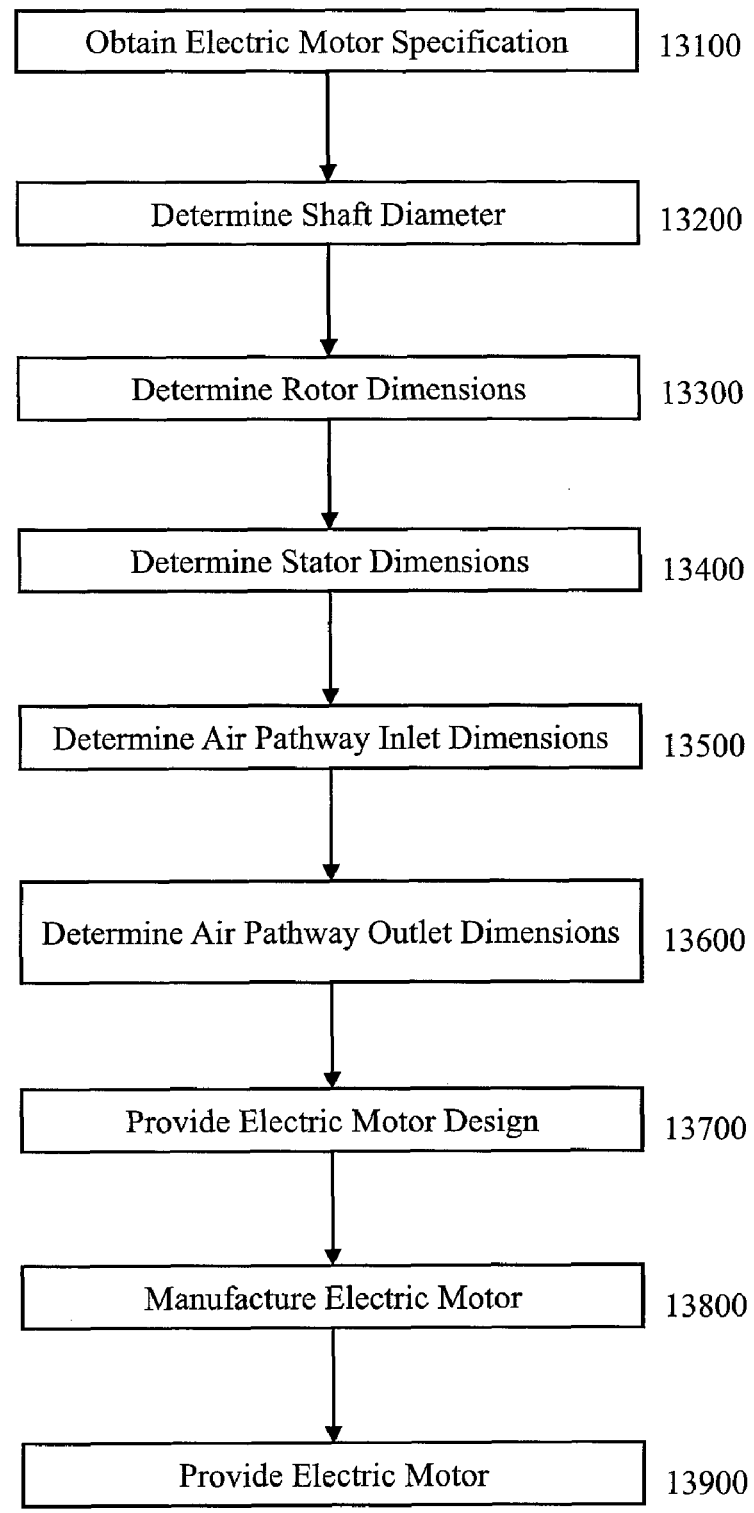
FIG. 13 is a flowchart of an exemplary embodiment of a method 13000.

FIG. 13 is a flowchart of an exemplary embodiment of a method 13000. At activity 13100, an electric motor specification can be obtained. The specification can be obtained from a customer and can request compliance with one or more industry standards, such as an API standard.

At activity 13200, a shaft specification can be determined and/or obtained and a shaft diameter can be established based upon the shaft specification. In certain exemplary embodiments, the shaft can be a stiff shaft and can have a larger diameter than a flexible shaft associated with a comparably sized and/or rated motor.

At activity 13300, rotor dimensions can be determined. The rotor dimensions can comprise a length and a diameter. The rotor dimensions can be automatically determined via an information device.

At activity 13400, stator dimensions can be determined. The rotor dimensions can comprise a length and a diameter. The stator dimensions can be automatically determined via an information device.

At activity 13500, air inlet pathway dimensions can be determined. The air inlet pathway can be partially defined by an end connector and/or a plurality of axial vent openings in each end of the rotor. The air inlet pathway dimensions can be automatically determined via an information device.

At activity 13600, air outlet pathway dimensions can be determined. The air outlet pathway can be partially defined by a plurality of rotor bars and/or a stator radial vent. The air outlet pathway dimensions can be automatically determined via an information device. A total resistance to a flow of cooling air can be determined based upon an air-inlet cross sectional area and/or an air outlet cross-sectional area. The overall design of the motor can be a computer-assisted design that results in an attempted minimization of air flow resistance subject to a plurality of constraints associated with structural and/or electromagnetic characteristics of components of the electric motor.

At activity 13700, the electric motor design can be provided to a manufacturing entity. The electric motor can have an output rating of greater than approximately 200 horsepower and/or a nominal operating speed of approximately 3600 revolutions per minute. The design can be an automatic design that predicts air flow and temperatures adjacent to one or more electric motor components. The electric motor can comprise a stiff shaft. The electric motor can have a ratio of a rotor core length to an outside stator diameter greater than approximately 0.7. The electric motor can defining an air pathway having a ratio of an inlet area to an outlet area of greater than approximately 1.0

At activity 13800, an electric motor can be manufactured based upon the electric motor specification and the plurality of determined dimensions associated with the electric motor.

At activity 13900, the electric motor can be provided to a customer entity. The customer entity can install the electric motor in an application, such as an oil management application associated with an API specification.

Figure 14:
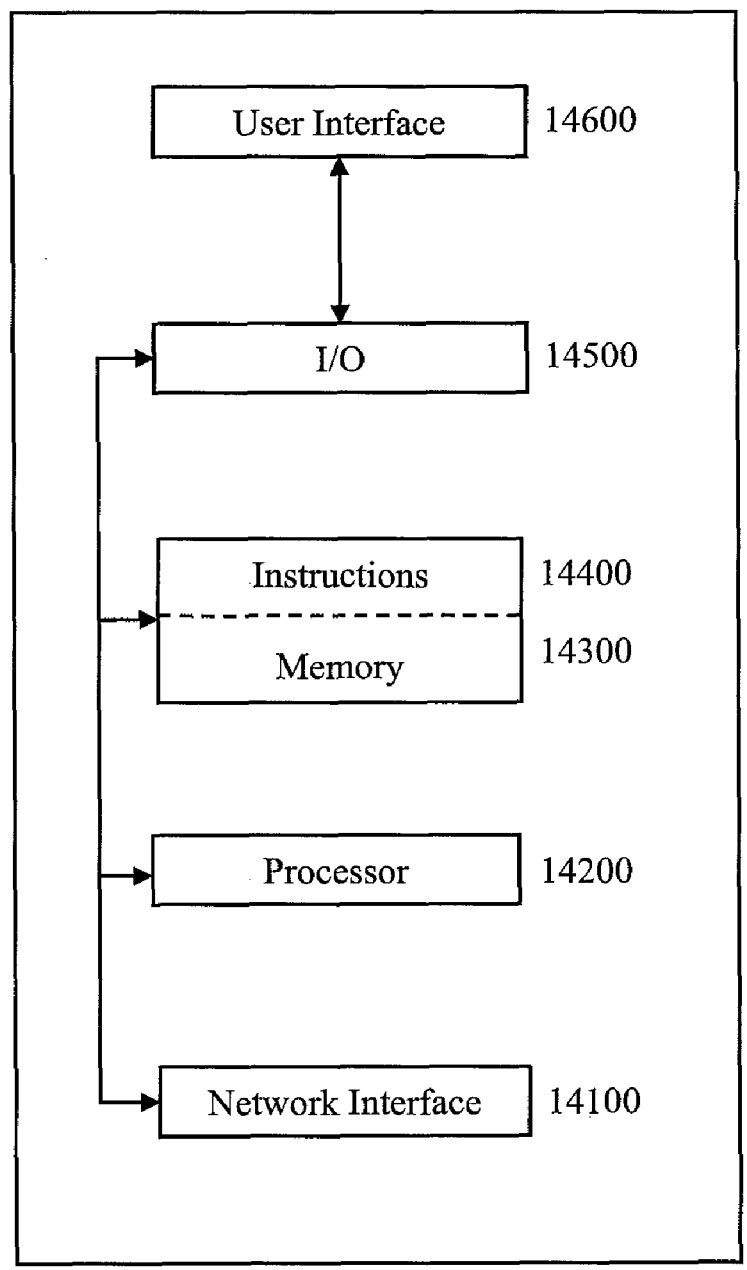
FIG. 14 is a block diagram of an exemplary embodiment of an information device 14000.

FIG. 14 is a block diagram of an exemplary embodiment of an information device 14000. Information device 14000 can comprise any of numerous components, such as for example, one or more network interfaces 14100, one or more processors 14200, one or more memories 14300 containing instructions 14400, one or more input/output (I/O) devices 14500, and/or one or more user interfaces 14600 coupled to I/O device 14500, etc.

In certain exemplary embodiments, via one or more user interfaces 14600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, deed, function, step, and/or process and/or a portion thereof.

adapted to—suitable, fit, and/or capable of performing a specified function.

adjacent—in close proximity to, near, next to, and/or adjoining.

air—the earth's atmospheric gas.

air flow—a current of air.

and/or—either in conjunction with or in alternative to.

apparatus—an appliance or device for a particular purpose.

approximately—about and/or nearly the same as.

associated with—related to.

at least—not less than.

automatically—acting and/or operating in a manner essentially independent of external human influence and/or control. For example, an automatic light switch can turn on upon "seeing" a person in its view, without the person manually operating the light switch.

based upon—determined in consideration of and/or derived from.

between—in a separating interval and/or intermediate to.

can—is capable of, in at least some embodiments.

capable—a potential for use.

cause—to bring about, provoke, precipitate, produce, elicit, be the reason for, result in, and/or effect.

circuit—an electrically conductive pathway and/or a communications connection established across two or more switching devices comprised by a network and between corresponding end systems connected to, but not comprised by the network.

characterize—to define, describe, classify, and/or constrain the qualities, characteristics, and/or peculiarities of.

component—a constituent element and/or part.

comprised by—included by.

comprise—to include but not be limited to.

cooling—reducing a temperature of a substance.

core—a portion of a rotor comprising components in which a current is induced.

critical speed—a speed at which mechanical resonance occurs.

define—to establish the meaning, relationship, outline, form, and/or structure of; and/or to precisely and/or distinctly describe and/or specify.

degrees Celsius—a unit of temperature. The Celsius temperature scale defines the freezing point of water is 0 degrees, and the boiling point is 100 degrees at standard atmospheric pressure.

design—(n) a purposeful arrangement of parts and/or details. For example, the design of a product and/or process can comprise designing predetermined aspects of the product and/or process. (v) to plan, such as in a manner that comprises the development of a graphic representation.

determine—to obtain, calculate, decide, deduce, establish, and/or ascertain.

device—a machine, manufacture, and/or collection thereof.

diameter—a length of a straight line segment passing through a center of an object and terminating at the periphery thereof.

electric motor—a motion-imparting device powered by electricity.

energy—usable power.

for—with a purpose of.

frame size—a designation that relates to a standardized set of motor dimensions that includes one or more of bolt hole size, mounting base dimensions, shaft height, shaft diameter, and shaft length.

from—used to indicate a source.

further—in addition.

greater—larger and/or more than.

group—a plurality of determined units.

have—to be identified by.

height—a measurement of the extent of something along a dimension.

horsepower—a unit of rate of doing work that equals approximately 746 watts.

inch—a unit of linear measurement in the English system equal to approximately 2.54 cm.

inlet area—a total cross-sectional area of cooling air openings located in a plane defined by a face of a rotor end.

lack—a particular deficiency or absence.

length—a longest dimension of something and/or the measurement of the extent of something along its greatest dimension.

less than—having a measurably smaller magnitude and/or degree as compared to something else.

manufacturing entity—a person, team, role, organization, computer, and/or application that constructs something.

may—is allowed and/or permitted to, in at least some embodiments.

method—a process, procedure, and/or collection of related activities for accomplishing something.

more—in greater quantity.

nominal—an intended value for a specified parameter.

obtain—to receive, get, take possession of, procure, acquire, calculate, determine, and/or compute.

operating speed—a speed of operation, which is typically between a synchronous speed and a full-load speed.

outlet area—a total cross-sectional area of cooling air openings in a circumferential surface of a rotor.

one—a single unit.

output rating—an expected performance capability of doing work.

outside—the space beyond a boundary and/or limit.

pathway—a route along which something moves.

plurality—the state of being plural and/or more than one.

portion—a part, component, section, percentage, ratio, and/or quantity that is less than a larger whole. Can be visually, physically, and/or virtually distinguishable and/or non-distinguishable.

produce—to generate via a physical effort.

predetermined—established in advance.

predict—prognosticate regarding a future event.

provide—to furnish, supply, give, convey, send, and/or make available.

rate—to estimate a performance capability.

ratio—a relationship between two quantities expressed as a quotient of one divided by the other.

receive—to gather, take, acquire, obtain, accept, get, and/or have bestowed upon.

regarding—pertaining to.

revolutions per minute—a number of complete rotations about an axis during a time period of one minute.

rise—increase.

rotor—a rotating portion of a machine.

rotor bar—one of a plurality of electrical and magnetically conductive metal pieces that extend between ends of a rotor.

said—when used in a system or device claim, an article indicating a subsequent claim term that has been previously introduced.

selected—a chosen item.

service factor—a multiplier that indicates the amount of overload a motor can be expected to safely handle.

shaft—a long, generally cylindrical bar that is adapted to rotate about a longitudinal axis and to transmit power.

sleeved bearing—a roller-less device that supports, guides, and/or reduces the friction of motion between two machine parts at least one of which parts is adapted for rotational motion.

speed—a linear, curvilinear, and/or angular velocity and/or a linear, curvilinear, and/or angular distance traveled during a predetermined time interval.

stator—a stationary part in or about which another part (the rotor) revolves.

stiff shaft—an electric motor shaft having a critical speed that is above a maximum operating speed of an electric motor.

substantially—to a considerable, large, and/or great, but not necessarily whole and/or entire, extent and/or degree.

system—a collection of mechanisms, devices, data, and/or instructions, the collection designed to perform one or more specific functions.

temperature—measure of the average kinetic energy of the molecules in a sample of matter, expressed in terms of units or degrees designated on a standard scale.

utilize—to use and/or put into service.

variable speed drive (VSD)—an electronic system adapted to control a rotational speed of an alternating current (AC) electric motor by controlling a frequency, phase, pulse width, and/or amplitude, etc. of electrical energy supplied to the motor.

via—by way of and/or utilizing.

wherein—in regard to which; and; and/or in addition to.

width—a measurement of the extent of something along a dimension.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, abstract, drawing figure, etc.) of this application, other than the claims themselves, is to be regarded as illustrative in nature, and not as restrictive.

What is claimed is:

1. An electric motor comprising:
   a frame;
   a generally annular stator having a circumferential outside diameter, mounted within the frame and defining a central bore;
   a rotor oriented within the stator central bore, having:
      a shaft, having a diameter, rotatively coupled to the frame;
      a generally cylindrical profile rotor lamination stack coupled to the shaft, defining a rotor outer circumference having a diameter and a core length, and further defining therein at least one axial vent for passage of cooling air flow;
      a generally annular end ring defining an annular lip projecting axially toward the lamination stack;
      an air gap defined between the annular lip and the lamination stack, in communication with the rotor axial vent, for passage of cooling air flow therethrough; and
      a rotor cooling air pathway at least partially defined by the air gap and the rotor axial vent, having an inlet area and an outlet area;
   the electric motor having an output rating of greater than approximately 200 horsepower and a nominal operating speed of approximately 3600 revolutions per minute and further:
      having a ratio of rotor core length to outside stator diameter greater than approximately 0.7; and
      defining a rotor cooling air pathway having a ratio of rotor cooling air inlet area to rotor cooling air outlet area of greater than 1.05.

2. The motor of claim 1, further comprising:
   a variable speed drive, the variable speed drive adapted to provide energy to the electric motor.

3. The motor of claim 1, further comprising sleeved shaft bearings.

4. The motor of claim 1, further comprising a ratio of a diameter of the shaft to an outside rotor diameter of greater than approximately 0.5.

5. The motor of claim 1, having a frame size selected from the group consisting of 8010, 8012, 6811 and 6813.

6. The motor of claim 1, further comprising:
   at least one radial vent defined by the rotor lamination stack in communication with the at least one axial vent and terminating on the circumference thereof; and
   at least one radial vent defined by the stator, aligned in opposed relationship with the at least one rotor axial vent, enabling fluid communication therebetween.

7. The motor of claim 6, further comprising:
   a axial cooling fan coupled to the frame in communication with the air gap for supplying cooling air flow thereto; and
   a fan shroud coupled to the frame generally concentric with the fan, oriented for diverting a portion of the fan cooling air radially toward an end turn portion of the stator.

8. The motor of claim 1, rated, under a predetermined load, to have no more than a 105 degree Celsius temperature rise in an environment of approximately 40 degrees Celsius.

9. The motor of claim 1, having a 1.15 service factor rating.

10. The motor of claim 1, wherein a critical speed of the shaft is greater than approximately 4320 revolutions per minute.

11. The motor of claim 1, wherein a diameter of at least a portion of the shaft is approximately 12.5 inches.

12. The motor of claim 1, further comprising rotor bars, the rotor bars approximately 1.0 inches in radial height.

13. The motor of claim 1, further comprising rotor bars, the rotor bars approximately 0.6 inches in width.

14. The motor of claim 1, wherein the electric motor is rated at 5000 horsepower and capable of producing 6500 horsepower.

15. An electric motor comprising:
   a frame;
   a generally annular stator having a circumferential outside diameter, mounted within the frame and defining a central bore;
   a rotor oriented within the stator central bore, having:
      a shaft, having a diameter, rotatively coupled to the frame;
      a generally cylindrical profile rotor lamination stack coupled to the shaft, defining a rotor outer circumference having a diameter and a core length, and further defining therein at least one axial vent for passage of cooling air flow;
      a generally annular end ring defining an annular lip projecting axially toward the lamination stack; and
      an air gap defined between the annular lip and the lamination stack, in communication with the rotor axial vent, for passage of cooling air flow therethrough; the motor further:
         having a ratio of a rotor core length to an outside stator diameter greater than approximately 0.7;
         having a ratio of a diameter of the shaft to an outside rotor diameter of greater than approximately 0.5;
         having an output rating of greater than approximately 200 horsepower;
         having a nominal operating speed of approximately 3600 revolutions per minute;

having a frame size selected from a group consisting of 8010, 8012, 6811, and 6813; and defining an air pathway having a ratio of an inlet area to an outlet area of greater than approximately 1.0.

16. An electric motor comprising:

a frame;

a generally annular stator having a circumferential outside diameter, mounted within the frame and defining a central bore;

a rotor oriented within the stator central bore, having:
- a shaft, having a diameter, rotatively coupled to the frame;
- a generally cylindrical profile rotor lamination stack coupled to the shaft, defining a rotor outer circumference having a diameter and a core length, and further defining therein at least one axial vent for passage of cooling air flow;
- a generally annular end ring defining an annular lip projecting axially toward the lamination stack; and
- an air gap defined between the annular lip and the lamination stack, in communication with the rotor axial vent, for passage of cooling air flow therethrough.

17. The motor of claim 16 further comprising:

a rotor cooling air pathway at least partially defined by the air gap and the rotor axial vent, having an inlet area and an outlet area.

18. The motor of claim 17 further comprising:

an axial cooling fan coupled to the frame in communication with the air gap for supplying cooling air flow thereto; and a fan shroud coupled to the frame generally concentric with the fan, oriented for diverting a portion of the fan cooling air radially toward an end turn portion of the stator.

19. The motor of claim 16 further comprising:

at least one radial vent defined by the rotor lamination stack in communication with the at least one axial vent and terminating on the circumference thereof; and at least one radial vent defined by the stator, aligned in opposed relationship with the at least one rotor axial vent, enabling fluid communication therebetween.

20. The motor of claim 19, wherein the rotor has a plurality of radial vents having asymmetrical axial spacing across the rotor core.

21. In an electric motor having:

a frame;

a generally annular stator having a circumferential diameter, mounted within the frame and defining a central bore;

a rotor oriented within the stator central bore, having:
- a shaft, having a diameter, rotatively coupled to the frame;
- a generally cylindrical profile rotor lamination stack coupled to the shaft, defining an outer circumference having a diameter and a core length, and further defining therein at least one axial vent for passage of cooling air flow;
- a generally annular end ring defining an annular lip projecting axially toward the lamination stack;
- an air gap defined between the annular lip and the lamination stack, in communication with the rotor axial vent, for passage of cooling air flow therethrough cooperatively defining therebetween at least a portion of a rotor cooling air pathway having an inlet area and an outlet area; and
- a method for varying airflow capacity of the rotor cooling air pathway comprising selectively sizing the annular lip to vary the air gap.

22. The method of claim 21, further comprising varying airflow capacity of the rotor cooling air pathway by providing any one of:

a cooling fan;

at least one radial vent defined by the rotor lamination stack in communication with the at least one axial vent and terminating on the circumference thereof;

at least one radial vent defined by the stator, aligned in opposed relationship with the at least one rotor axial vent, enabling fluid communication therebetween;

an inlet area defined by the frame;

an outlet area defined by the frame; and selectively sizing same to achieve desired airflow.

* * * * *